(12) United States Patent
Clay

(10) Patent No.: US 10,342,240 B2
(45) Date of Patent: *Jul. 9, 2019

(54) FRYING TECHNOLOGY

(71) Applicant: OIL PRESERVATION TECHNOLOGIES LTD, East Yorkshire (GB)

(72) Inventor: Andrew J. Clay, West Yorkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,422

(22) PCT Filed: Aug. 24, 2015

(86) PCT No.: PCT/GB2015/052442
§ 371 (c)(1),
(2) Date: Feb. 21, 2017

(87) PCT Pub. No.: WO2016/027107
PCT Pub. Date: Feb. 25, 2016

(65) Prior Publication Data
US 2017/0273331 A1    Sep. 28, 2017

(30) Foreign Application Priority Data
Aug. 22, 2014  (GB) .................................. 1414993.4

(51) Int. Cl.
*A23D 9/06* (2006.01)
*A23D 9/007* (2006.01)
*C11B 5/00* (2006.01)

(52) U.S. Cl.
CPC ............... *A23D 9/06* (2013.01); *A23D 9/007* (2013.01); *C11B 5/0092* (2013.01)

(58) Field of Classification Search
CPC ......... A23D 9/06; A23D 9/007; C11B 5/0092
USPC ........... 426/74, 423, 438, 521, 601; 252/380
See application file for complete search history.

(56) References Cited

U.S. PATENT DOCUMENTS

2007/0141222 A1 *  6/2007  Binder et al.
2013/0112607 A1 *  5/2013  Bratton et al.

* cited by examiner

*Primary Examiner* — Helen F Heggestad
(74) *Attorney, Agent, or Firm* — Edwin D. Schindler

(57) ABSTRACT

A method for preserving cooking oil comprises contacting the oil with oil-permeable cementitious material in the form of either stand-alone blocks, pellets, granules, or balls and which has been hydraulically hardened from a paste comprising (a) >50 wt % of (i) white OPC clinker, (ii) white OPC or (iii) a mixture of white OPC clinker and white OPC, and (b) optionally further ingredients selected from silica, titania, lime, calcium sulphate, hydrated alumina, natural feldspars, diatomaceous earth, Na and Ca forms of natural and synthetic zeolites, clays, pillared clays, activated clays/earths, silicate minerals selected from calcium silicate, magnesium silicate, aluminum silicate, agalmatolite, amphiboles, attapulgite, granite porphyry, kaolinite, porphyry, rhyolite, talc and wollastonite, wherein the porosity of the cementious material is 30-55%. The treatment of the cooking oil takes place in a location separate from the frying chamber.

12 Claims, 10 Drawing Sheets

FRYING TECHNOLOGY

CROSS-REFERENCE TO RELATED PATENT APPLICATIONS

This application is a U.S. National Phase Application under 35 U.S.C. § 371 of International Patent Application No. PCT/GB2015/052442, filed Aug. 24, 2015, and claims the priority of Great Britain Application No. 1414993.4, filed Aug. 22, 2014, all of which are incorporated by reference in their entireties. The International Application was published on Feb. 25, 2016 as International Publication No. WO 2016/027107 A1.

FIELD OF THE INVENTION

This invention relates to improvements in technology relating to methods for the treatment of cooking oils and fats. It is particularly although not exclusively suitable for use in larger frying equipment (over 30 liter capacity).

INTERPRETATION

In this patent specification references to oils should be interpreted as being references to animal, vegetable, nut or synthetic oils and fats (which are generally solid at room temperatures). References to fryers herein should be taken as including any frying equipment, chamber, pan, tank, commercial, domestic or industrial fryer.

BACKGROUND TO THE INVENTION

Deep fat frying has become one of the most popular methods of cooking in domestic, restaurant and industrial establishments throughout the World. Because of the high temperatures involved (typically 160 to 200° C.) it is relatively quick, cooks food right through to the middle, generates a distinctive crust on the food and perhaps most importantly produces rich and complex flavours and food textures, which are very appealing to the consumer.

Frying, whether carried out in oils or fats, however also has a number of well-known disadvantages.

Cooking oil is expensive: high end olive oils are more expensive per liter than petrol or diesel and the price of even lower end cooking oils is comparable to that of petrol or diesel. Cooking oils have to be replaced frequently as the oils degrade during the cooking process, as more fully explained hereinafter. Also cooking oils (and their breakdown products) are absorbed by the food cooked in them which therefore necessitates the operator of a fryer to regularly keep the oil or fat topped up by the addition of extra cooking oil or fat. Cooking in oil therefore comes at a relatively high price compared to boiling in water or roasting in air.

The frequent changing of cooking oil in kitchens, restaurants and industrial sites where food items are manufactured is also a labour intensive and laborious task, which is costly and increases equipment down-time.

Unfortunately it is not possible to extend the life of cooking oils and fats merely by filtering out food debris particles, which frequently accumulate within them. During use cooking oils and fats do not remain unaltered but begin to chemically breakdown. Cooking oils and fats are commonly referred to as triglycerides but are in fact triacylglycerols: i.e. triesters of glycerol (1, 2, 3 propanetriol, which is commonly referred to as glycerine) and three fatty acids. The fatty acids do not need to be of the same type and frequently are not. Common chain lengths for the fatty acids, as determined by gas liquid chromatography, are 12 to 24 carbon atoms with 16 and 18 being particularly favoured. The breakdown of such triglycerides is complex, dependent on numerous factors and is subject to numerous feedback effects but involves three well-understood basic mechanisms: oxidation, polymerisation and hydrolysis.

Oxidation

Oxidation occurs when air comes in contact with frying oil, (see for example Josephson and Lindsey 1987, Journal of Food Sciences, 52, 328 and Fischer and Muller 1991, Potato Research, 34, 159). Oxygen from the air reacts with the two unsaturated carbons at the double-bond via a free radical initiated reaction. The oxidation reaction is promoted by high cooking temperatures (typically 190° C. and above), the presence of metals (including in particular copper and iron) and the presentation to the air of a large surface area of the oil as well as exposure to UV light, which promotes free radical formation. Initially hydroperoxides are produced but these are unstable and at frying temperatures they rapidly break down (via e.g. fission, dehydration and free radical formation) to produce a wide array of secondary oxidation products including polymers, acids, alcohols, esters, aldehydes, methyl ketones, lactones, alcanes, aromatics and other hydrocarbons, (see Belitz and Grosch 1999, Food Chemistry, $2^{nd}$ edition, Springer-Verlag, Berlin, p. 211).

Some of these secondary oxidation products are volatile and give rise to both pleasant rich flavours but some are also associated with rancid and offensive flavours. For example only 0.08 ppm of pentane is sufficient to reliably produce rancidity, (Warner et al. (1974) Journal of Food Science, 39, 761). Non-volatile compounds, such as core aldehydes, remain in the oil and are absorbed by the food.

Polymerisation

When cooking oil breaks down, the resulting products form both volatile low boiling point and higher boiling point non-volatile compounds. The non-volatile higher boiling point compounds remain within the frying oil and readily polymerize at frying temperatures above 190° C. or in isolated hot spots within the fryer. Such polymerisation products can then bond together to form larger clusters, which can accumulate as an insoluble layer on the surface of the oil, thus preventing water vapour, evaporating from food cooking in the oil, escaping from the oil's surface and thereby producing dangerous foaming, which can lead to fires and personal injury of kitchen staff.

The presence of the impermeable polymer layer in turn promotes more hydrolysis in what can become a runway feed-back driven process. Polymerisation also leads to an increase in the viscosity of the oil which reduces its ability to effect heat transfer and promotes yet more polymerisation. The increase in viscosity also increases the amount of energy required to effect cooking and thus increases energy bills.

Hydrolysis

Hydrolysis is caused by the reaction of water (a weak nucleophile) with the ester linkage in the triacylglycerol molecule to produce initially a diaglyceride and a free fatty acid, which then further breakdown to produce various compounds including lactones or simply boil off, depending on chain length, saturation and other factors. The presence of free fatty acids is frequently associated with a characteristic rancid or acidic flavour.

The production of free fatty acids in cooking oils is additionally problematical for several reasons.

Firstly free fatty acids are one of the main constituents of smoke haze and are both a fire and a health hazard. The smoke point of an oil is the temperature, at which it is seen to start smoking under specified test conditions. The flashpoint of an oil is the temperature at which volatile products are produced in sufficient concentration and quantity to allow ignition. The fire point of an oil is the temperature at which the rate of production of volatile products is sufficiently high to support continuous combustion of the gases emerging from the surface of the oil.

High levels of free fatty acid in cooking oils are associated with reduced smoke, flash and fire points and are thus a significant fire hazard. For example Weiss (Food Oils and Their Uses, Wesport, The AVI Publishing Co. 1983) found that a free fatty acid composition of 0.04% was associated with a smoke point of 218° C., a flashpoint of 327° C. and a fire point of 366° C. whereas for the same oil increasing the free fatty acid content to just 1% percent lead to the smoke point decreasing to 160° C., the flashpoint decreasing to 307° C. and the fire point dropping to 360° C.

In addition to being a fire hazard, an increase in the concentration of free fatty acids (and their break down products) in cooking oils also has deleterious effects on the preparation of food cooked in such oils.

Fatty acids and some of their breakdown products, having both distinct hydrophobic and hydrophilic regions, act as effective surfactants. The effect of the concentration of surfactants in cooking oil on the properties of the food cooked in such oil is well-known (see e.g. Blumenthal MM A New Look At The Chemistry And Physics Of Deep Fat Frying: Food Technology, 1991, 45:2, 68-71, 94). When for example chips are cooked in fresh unused cooking oil they are light in colour and do not have the rich complex aromas associated with fried potatoes. The oil, during this "break in" phase has only low levels of surfactants (such as free fatty acids), which means that the oil has a relatively high surface tension which prevents the oil having close contact with the food. The heat from the oil is not effectively transferred across the oil/wet-food barrier and the food is in part boiled rather than fried as the steam emerging from the food pushes a substantial amount of the oil away from its surface. As the oil is used further the amount of free fatty acid and other surfactants increases resulting in improved food quality. During the so-called optimum phase chips cooked in the oil are golden brown in colour and have a significant crust but with relatively low levels of oil being absorbed by the food, which is cooked through to the centre. For example fresh French fries will typically consist of about 10% by weight of oil, when cooking during the so called optimum phase. However as the oil is subject to both further hydrolysis and oxidation, the increase in free fatty acids and other surfactants decreases the surface tension significantly and ensures that the oil can rapidly bridge the otherwise immiscible oil food barrier. This results in the surface of, for example, chips having a characteristic dark and spotted appearance. Excessive contact with the oil rapidly dries the surface of the food thus trapping moisture in the food and inhibiting heat penetration deeper within the food's centre, which therefore typically is undercooked. The resulting greasy chip with an oil content by weight of typically in excess of about 20%, with a dark spotted exterior and undercooked centre, is familiar to many who have eaten at down market fast food establishments, which do not change their cooking oil often enough.

The absorption of excessive amounts of cooking oils by food cooked in the oil also very significantly increases the calorific value of the food, thus giving many consumers extra calories they do not need and promoting obesity and the numerous health problems associated with it including in particular type II diabetes.

Further the absorption of excessive amounts of cooking oil by food has other important consequences for health. Hydrogenated vegetable oils and fats are widely used in cooking due mainly to their increased stability, resistance to oxidation, longer shelf-life and their greatly increased resistance to rancidity.

However such oils contain increased amounts of trans-fatty acid side chains on the glycerol backbone, which are a material health hazard. After ingestion most of the initial digestion of cooking oils is accomplished in the stomach via specialist pancreatic enzymes (lipases) and bile secretions. The resultant fatty acids and glycerol are then absorbed by cells lining the intestines called enterocytes, where they are re-esterified into triglycerides and transported to the liver as chylomicrons. When the chylomicrons reach the liver, the fatty acids are repackaged into triacylglycerols and phosphatidylcholine and thence into lipoproteins.

High levels of trans fatty acids in the diet are associated with raised serum levels of low density lipoprotein (LDL) cholesterol and with lower levels of high density lipoprotein (HDL) cholesterol in humans. Raised serum LDL and reduced serum HDL levels are associated with coronary artery disease, increased risk of stroke and elevated blood pressure as they decrease the health of the endothelium, the cells lining the arteries of the body which are essential for good cardiovascular health. Studies in humans further demonstrate that trans fats increase inflammation in the body, a potent risk factor for cardiovascular disease, diabetes, and other diseases. Studies in primates have demonstrated that trans fats cause weight gain, especially increasing abdominal fat, which has the greatest metabolic consequences, and is associated with insulin resistance, a known precursor to type II diabetes.

For all these reasons the amount of trans-fatty acids absorbed in the diet should be kept at low levels. One way of achieving that is to reduce the amount of hydrogenated cooking oil absorbed by fried food.

Various ways have been suggested to prolong the useful life of cooking oils. Some of these involve the step of removing the cooking oil from the fryer, followed by the step of subjecting it to one or more treatment methods to remove the contaminants before finally returning the treated oil back to the fryer. Other methods provide for at least the complete cessation of the cooking process, treatment and then the recommencement of the use of the oil.

Oil Removal and Treatment Methods

U.S. Pat. No. 4,112,129 (Duensing et al., Johns Manville) discloses a method of filtering the cooking oil through a composition comprising by weight (i) 47 to 59 parts diatomite, (ii) 28 to 36 parts synthetic calcium silicate hydrate and (iii) 12 to 24 parts synthetic magnesium silicate hydrate.

U.S. Pat. No. 4,681,768A (Mulflur W Jospeph et al) discloses a method for the continuous treatment of cooking oil with a filter made from synthetic calcium silicate. The method involves removal of the oil from the fryer, passing it through the filter and then passing it back into the fryer.

GB 2006729 (Johns Manville) discloses a method for filtering used cooking oils to remove free fatty acids, which uses synthetic calcium silicate but does not disclose an in situ solution suitable for unadapted fryers.

U.S. Pat. No. 5,870,945 discloses a filter cartridge for fitting to a fryer, which includes a mesh housing for containing filtering material which is used to treat the cooking oil outside the fryer prior to its return to the fryer.

U.S. Pat. No. 4,112,129A discloses a method for extending the life of cooking oil by removing free fatty acids which involves treating the oil with a composition of synthetic calcium silicate hydrate and synthetic magnesium silicate hydrate. U.S. Pat. No. 4,112,129A states that the method can be used with conventional cooking oil treatment systems but does not disclose an in situ solution suitable for unadapted fryers which do not have a treatment system.

EP 0226413A discloses a filter container provided with a removable filter bag but which cannot be used during the cooking operation.

U.S. Pat. No. 6,210,732 discloses a method of extending the life of cooking oil by the use of a blend of finely milled citric acid and calcium silicate powder, which is added to the hot oil, left for a certain length of time and then removed by treatment. The U.S. Pat. No. 6,210,732 invention cannot be used during the cooking process.

WO 91/11914A discloses a still further treatment method for used cooking oils, which uses an amorphous silica and alumina composition, which is either added to the hot oil and then filtered out or put in a container which is permeable to the oil but not the treatment composition. The invention disclosed cannot be used during the cooking operation.

U.S. Pat. No. 4,330,564A discloses a method of treating used cooking oil with a composition including a porous carrier, water and a food compatible acid, with the resultant residue being removed by treatment. The invention disclosed cannot be used during the cooking operation.

U.S. Pat. No. 3,947,602A discloses a method of treating cooking oil with a food compatible acid and a suitable adsorbent such as activated carbon. The invention disclosed cannot be used during the cooking operation.

U.S. Pat. No. 5,391,385A discloses the treatment of cooking oil with a mixture of 60-80% amorphous silica and 20 to 40% alumina, the mixture being placed in a permeable container which is then placed in the oil, the container being permeable to the oil but not to the mixture so that the adsorbent is not released into the oil and no treatment is required.

All the above treatment methods either require removal of the oil from the fryer and its treatment before reuse and/or cannot be carried out during the normal frying operation with standard frying equipment, which does not include in-line treatment equipment and a pump.

In Situ Treatment of Cooking Oil

Other methods are known for the treatment of cooking oil in the vessel where cooking takes place.

U.S. Pat. No. 4,764,384A discloses a method of treating used cooking oil with filtering media comprising synthetic amorphous silica, synthetic amorphous magnesium silicate and diatomaceous earth.

U.S. Pat. No. 5,354,570A discloses a method of frying food in cooking oils with a porous rhyolitic powder which selectively reduces the concentration of certain surfactants, whilst the cooking process is on-going.

JP 07-148073A discloses a method of treating cooking oil using finely pulverized zeolite stones which are inserted into a permeable bag which is itself placed into the fryer, with or without food also being present.

The above methods either require the addition of powders to the oil, which is undesirable as they may contaminate and change the texture and taste of any food cooked therein or require a further container to be added to the oil, which will often be problematical during use of the fryer due to space and other constraints.

The WO 2008/015481 and WO 2009/019512 Inventions

WO 2008/015481 and WO 2009/019512 ("the BBM Patents") (BBM Technology Limited) disclose the use of cementious hydraulically set filters made from ordinary Portland cement (OPC), white cement clinker and mixtures thereof, in the form of standalone briquettes, blocks, pellets, granules or balls, which do not substantially leach calcium or magnesium into cooking oils.

The BBM Patents disclose the use of such treatment elements in cooking oils (a) in situ actually in the frying chamber where the food is being fried during the frying operation and also (b) prior to first use when the cooking oil is in a storage container. WO 2009/019512 additionally discloses the use of film or sheet packaging that resists the ingress of water or water vapour for wrapping the filters, after they have been dried to remove free water after hydraulic setting.

Industrial Frying

Frying is a popular way of treating food products in the food industry. The manufacture of crisps, other fried potato products and pre-fried potato products (particularly chips) is carried on on a substantial scale in many countries. Pre-fried potato products are products that are pre-fried during manufacture, packaged and then finished before consumption, typically in a fast food restaurant, pub or by the end user. Finishing can be carried out by finish or flash frying but oven, air and microwave frying have become more popular over recent years, due to concerns about the health risks associated with cooking in oil.

It is not only potato products that are fried on an industrial scale. Maize products are also processed into a wide variety of snack products, one of them being the Tortilla chip, which accounts for a large percentage of the capacity delivered by the snacks industry.

Fried products produced by the food industry are typically made on a substantial scale, packaged for transport and typically consumed away from the site where they are made. Frying equipment used in the food industry is often substantial is size, containing tens, hundreds or even thousands of liters of cooking oil. For example, equipment used to prepare pre-fried potato chips (French fries) or crisps may have a frying chamber with 1000 liters of oil and possibly up to 5000 or even 10,000 liters of oil. Modern French fry lines typically have a high capacity of between 15 to 30 tonnes per hour, being fed with 30 to 60 tonnes of potatoes an hour.

Such equipment is expensive to buy, often costing tens or even hundreds of thousands of pounds. Operators of such equipment are also reluctant to have the equipment non-operational for any length of time for economic reasons.

It has been found that the filters described in the BBM Patents do not work very effectively if merely put into the frying chambers of such large scale fryers: no material extension of the life of the cooking oil was found using such filters in large industrial fryers when they were simply put into the frying chamber. Without wishing to be bound by any particular theory, it is thought that this was due to the limited circulation of oil due to convection currents in such large frying chambers, Oil located distant from the filters is not able to come into intimate contact with the filter material and thus retains the contaminants and oxidation, hydrolysis and polymerisation breakdown products associated with the degradation of cooking oil during the cooking process.

Further in very large frying equipment it is either impossible due to space constraints or cumbersome and unacceptable to the operator to put large numbers of filters into the fryer. This is particularly true of more modern continuous process fryers, which use much less oil than older models in particular by virtue of having shallower frying chambers, which do not readily accommodate filter briquettes or filter materials in other forms (pellets, balls etc).

There remains therefore a need for a practical way of utilising the treatment elements (made from those generally cementious materials and in accordance with the teaching as both are disclosed in the BBM Patents) in a manner that is suitable for use in larger scale industrial frying equipment.

SUMMARY OF THE INVENTION

The invention is applicable to the treatment of cooking oils in larger industrial fryers.

In one aspect there is provided a method of treating cooking oil, during the frying operation or between frying operations, which comprises the temporary removal of the cooking oil from the frying chamber into a separate chamber, in which a number of treatment elements (made from those generally cementious materials and in accordance with the teaching as both are disclosed in the BBM Patents), are located, the circulation and treatment of the oil in such chamber and then its reintroduction back into the frying chamber.

The invention further comprises a method of retarding free fatty acid formation and/or reducing the amount of fatty acids formed in cooking oil, which comprises the temporary removal of the cooking oil, during the frying operation or between frying operations, from the frying chamber into a separate chamber in which a number of treatment elements (made from those generally cementious materials and in accordance with the teaching as both are disclosed in the BBM Patents) are located, the circulation and treatment of the oil in such chamber and then its reintroduction back into the frying chamber.

The invention further comprises a method of retarding the formation and/or reducing the amount of oxidation products (including aldehydes) in cooking oil, which comprises the temporary removal of the cooking oil, during the frying operation or between frying operations, from the frying chamber into a separate chamber in which a number of treatment elements (made from those generally cementious materials and in accordance with the teaching as both are disclosed in the BBM Patents) are located, the circulation and treatment of the oil in such chamber and then its reintroduction back into the frying chamber In a further aspect of the invention there is provided a treatment system comprising a means for effecting the temporary removal of cooking oil, during the frying operation or between frying operations, from the frying chamber into a separate chamber in which a number of treatment elements (made from those generally cementious materials and in accordance with the teaching as both are disclosed in the BBM Patents) are located, means to allow the circulation and treatment of the oil in such chamber and further means for then reintroducing the oil back into the frying chamber.

BRIEF DESCRIPTION OF THE DRAWINGS

How the invention may be put into effect will now be further described with reference to the accompanying drawings in which: —

DESCRIPTION OF PREFERRED EMBODIMENTS

Materials

The treatment materials that are suitable for use in embodiments of this invention are those cementious materials that are disclosed in the specifications of the BBM Patents, which are incorporated herein in their entirety by reference. Particularly suitable treatment materials are cementious materials made substantially from pastes comprising (a) >50 wt % of (i) white OPC clinker or (ii) white OPC or (iii) a mixture of white OPC clinker and white OPC, and (b) optionally further ingredients selected from silica, titania, lime, calcium sulphate, hydrated alumina, natural feldspars, diatomaceous earth, Na and Ca forms of natural and synthetic zeolites, clays, pillared clays, activated clays/earths, silicate minerals selected from calcium silicate, magnesium silicate, aluminium silicate, agalmatolite, amphiboles, attapulgite, granite porphyry, kaolinite, porphyry, rhyolite, talc and wollastonite, wherein the porosity of the cementious material is 30-55%.

Such pastes advantageously also contain minor amounts of microsilica/silica fume and suitable air entraining agents, as hereinafter described.

As an alternative to using a mixture of OPC and clinker, the man skilled in the art will readily appreciate that it is possible to make the treatment medium of the invention using either OPC alone or clinker alone, OPC alone being preferred because of its ready availability and ease of handling compared to clinker. Where clinker alone is used in place of a mixture of OPC and clinker then calcium sulphate (anhydrite) must be added to prevent flash setting.

Fryers

The invention is applicable to the treatment of cooking oils in deep fat fryers, which may be of the counter-top single-basket type (typically having an oil capacity of 3 to 10 liters) or twin-basket deep fat fryers (typically having an oil capacity of 7-16 liters) or in connection with medium duty freestanding deep fat fryers of oil capacity of e.g. 12-30 liters. The invention is also particularly suitable for use with larger industrial scale deep fat fryers having a capacity from 30 to 10,000 liters.

Figure 1:
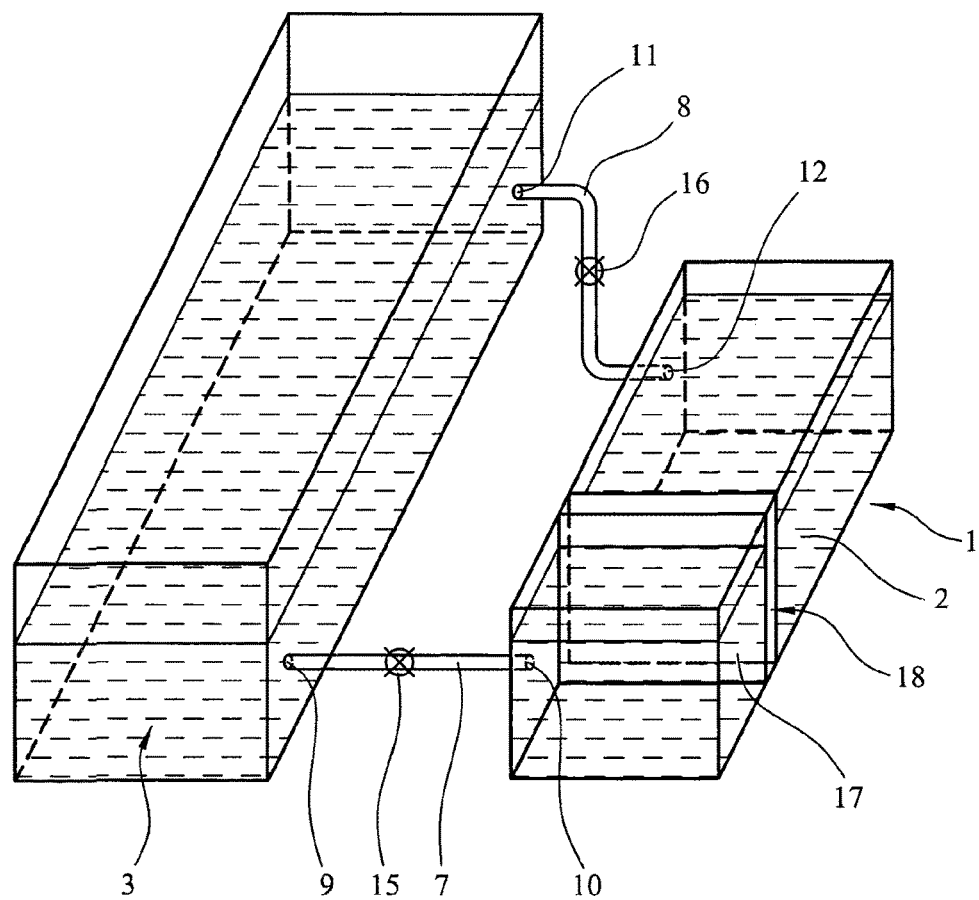
FIG. 1 is general arrangement drawing.
Figure 2:
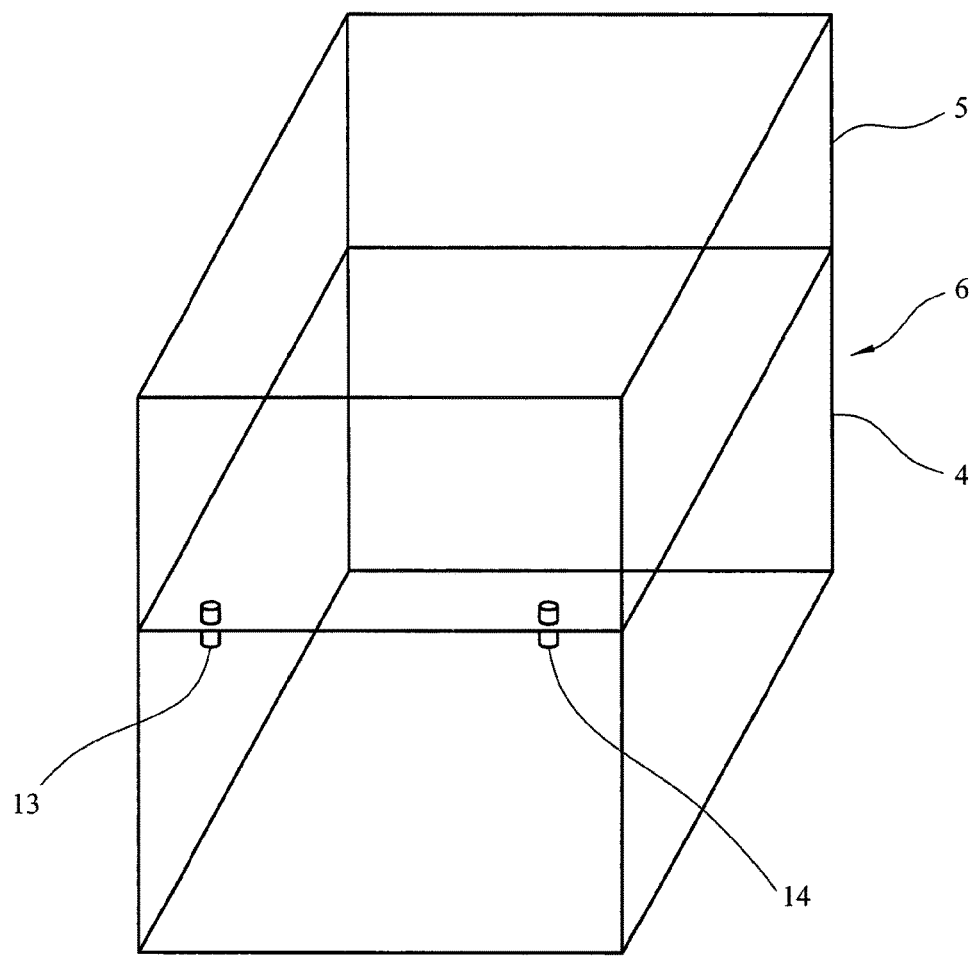
FIG. 2 is a general arrangement drawing showing a system wherein the frying chamber is integral with the treatment chamber.

In one embodiment of the invention there is provided a treatment tank (1), capable of holding between 10 to 5000 liters, most preferably 30 to 200 liters of cooking oil, (2). The treatment tank (4) may be located integrally with the frying chamber (5) as part of one assembly (6) as depicted in FIG. 2. Alternatively the treatment tank (1) may also be located separately away from the frying chamber (3), as depicted in FIG. 1. The treatment tank may be made of stainless steel, another suitable metal, of a high temperature plastics material or of a ceramics material or from bricks or from any other material which is stable at the temperatures experienced during the food frying process (typically up to approximately 200° C.) and which is resistant to attack by virtue of a chemical reaction with the cooking oil.

An inlet channel (7) and an outlet channel (8) are provided between the frying chamber (3) and the filtration tank (1). The said channels may take the form of lengths of piping made from stainless steel, another suitable metal, of a high temperature plastics or rubber material or of a ceramics material or from bricks or from any other material, which is stable at the temperatures experienced during the food frying process (typically up to approximately 200° C.) and which is resistant to attack by virtue of a chemical reaction with the cooking oil. Both ends of the inlet channel (9, 10) and both ends of the outlet channel (11, 12) are preferentially located below the level of the oil to facilitate pumping and also to reduce exposure of the oil to the air.

The channels may also take the form of conduits (13, 14) between the frying chamber and the treatment tank, as illustrated in FIG. 2. During use of the invention the cooking oil flows from the frying chamber via inlet channel entrance (9) into the inlet channel (7) and out via inlet channel exit (10) into the treatment tank (1). After treatment in the tank, the cooking oil is returned to the frying chamber via the outlet channel entrance (12), the outlet channel (8) and out via the outlet channel exit (11) into the frying chamber (3). It is preferable that the end of the inlet channel that is in the frying chamber (9) is located as far away as possible in the frying chamber from the end of the returning outlet channel (11), so as to facilitate the treatment of all the oil in the frying chamber.

Flow of oil from the frying chamber to the treatment tank is effected either by gravity flow and/or by the use of suitable pump means, (15). Flow of oil from the treatment tank back to the frying chamber can also be accomplished by gravity flow and/or by the use of suitable pump means (16).

Figure 3:
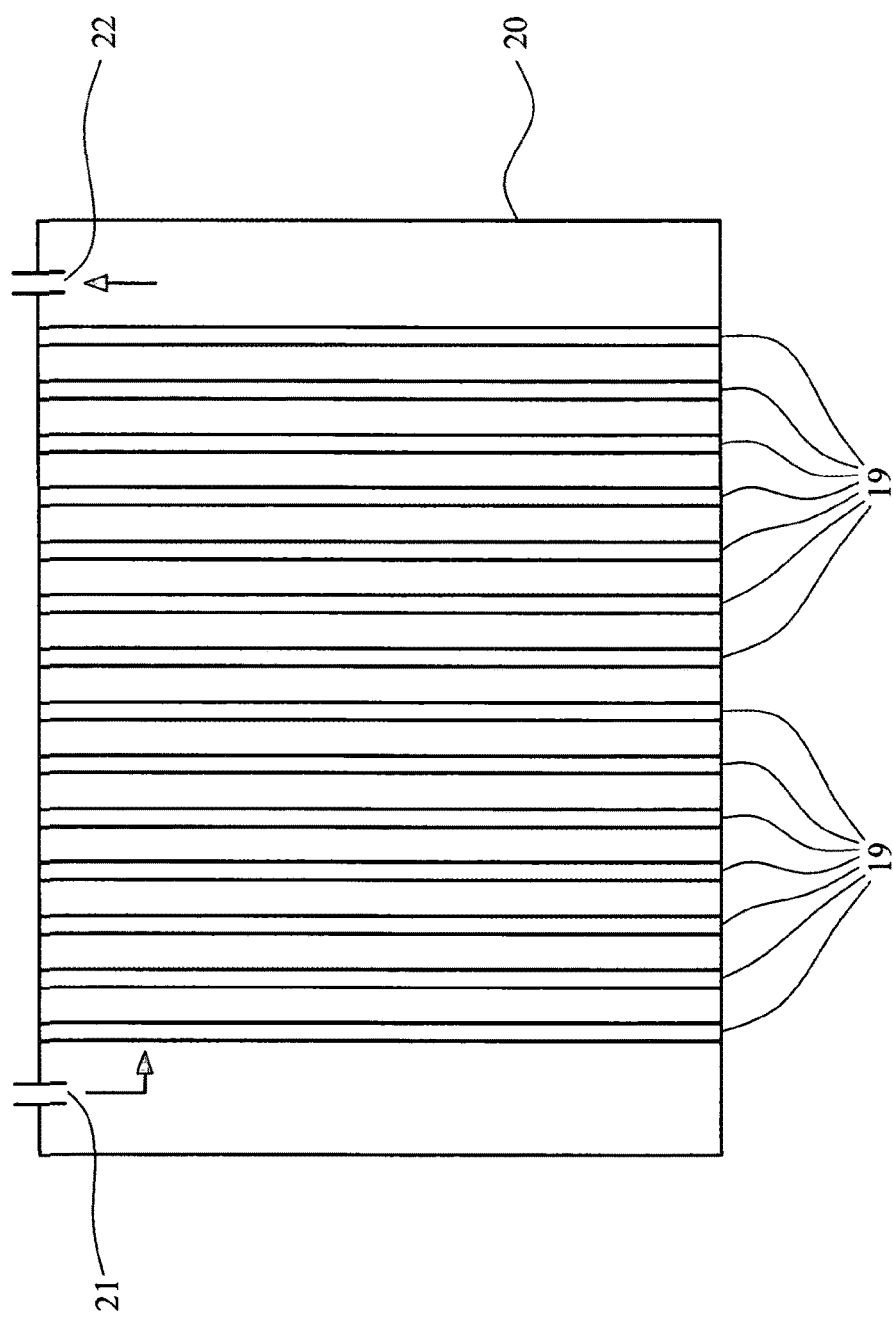
FIG. 3 is a drawing showing the layout of the invention seen from above

The location of the exit of the inlet channel (12) and the outlet channel entrance (13) are such as to afford the oil entering the treatment tank (14) an opportunity to come into intimate contact with the treatment material (17) made in accordance with the disclosures effected by the BBM patents. In one embodiment for example, as shown in FIG. 1, the inlet channel is on one side of a substantially vertical treatment member (18) on one side of which is the inlet channel exit (10) and on the other side of which is the outlet channel entrance (12) so that oil passing from the inlet channel exit (10) to the outlet channel entrance (12) has the opportunity for intimate contact with the treatment material (17) in the vertical treatment member (18). So as to aid effective treatment of the oil, multiple such treatment members (19) may be used in the treatment tank (20) between the inlet channel exit (21) and the outlet channel entrance (22) as shown in FIG. 3.

The treatment member will now be described in more detail. The treatment member comprises elements containing treatment material made in accordance with the inventions disclosed in the specifications of the BBM Patents.

Figure 4:
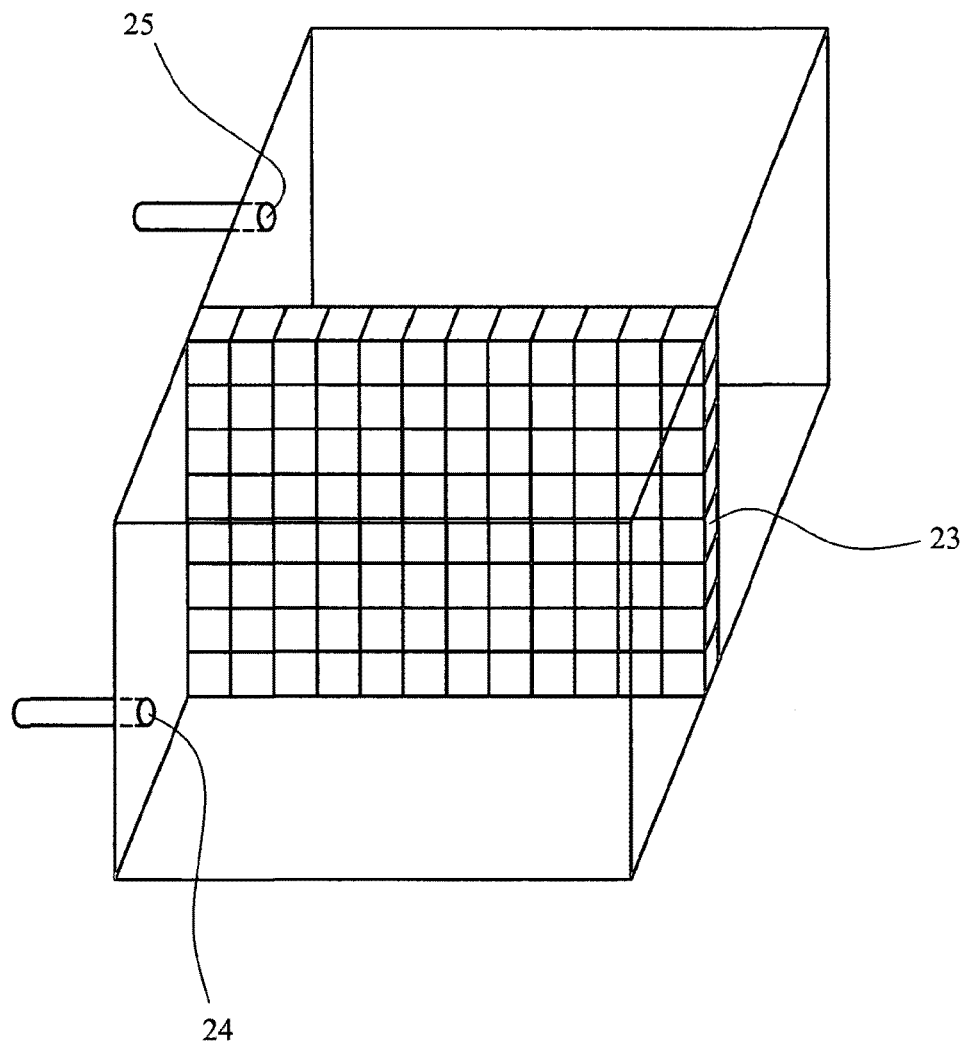
FIGS. 4-7 are further general arrangement drawings of various embodiments of the invention.
Figure 5:
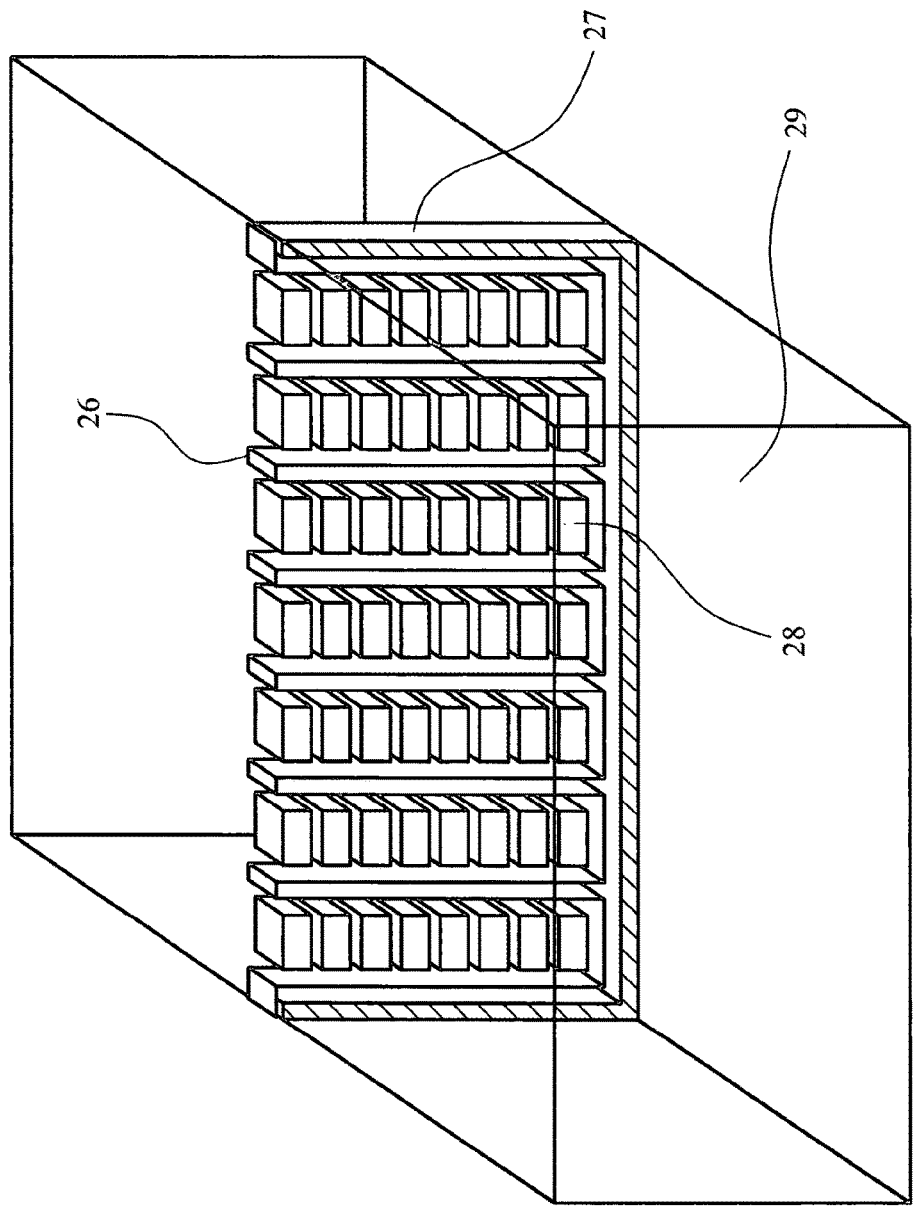

In one embodiment of the invention, illustrated in FIG. 4, the vertical treatment member (20) comprises treatment briquettes (21) stacked on top of each other so as to form a more or less continuous barrier as shown in FIG. 5 between the inlet channel exit (24) and the outlet channel entrance (25).

In another embodiment of the invention, illustrated in FIG. 5, the treatment briquettes are held in a cartridge (26), held in place by a frame (27) so as to form a more or less continuous barrier of treatment briquettes (28) as shown in FIG. 5, which affords cooking oil to be treated in the treatment tank (29) an opportunity for intimate contact with the treatment media. There may be more than one separate treatment cartridge in each such barrier.

Figure 6:
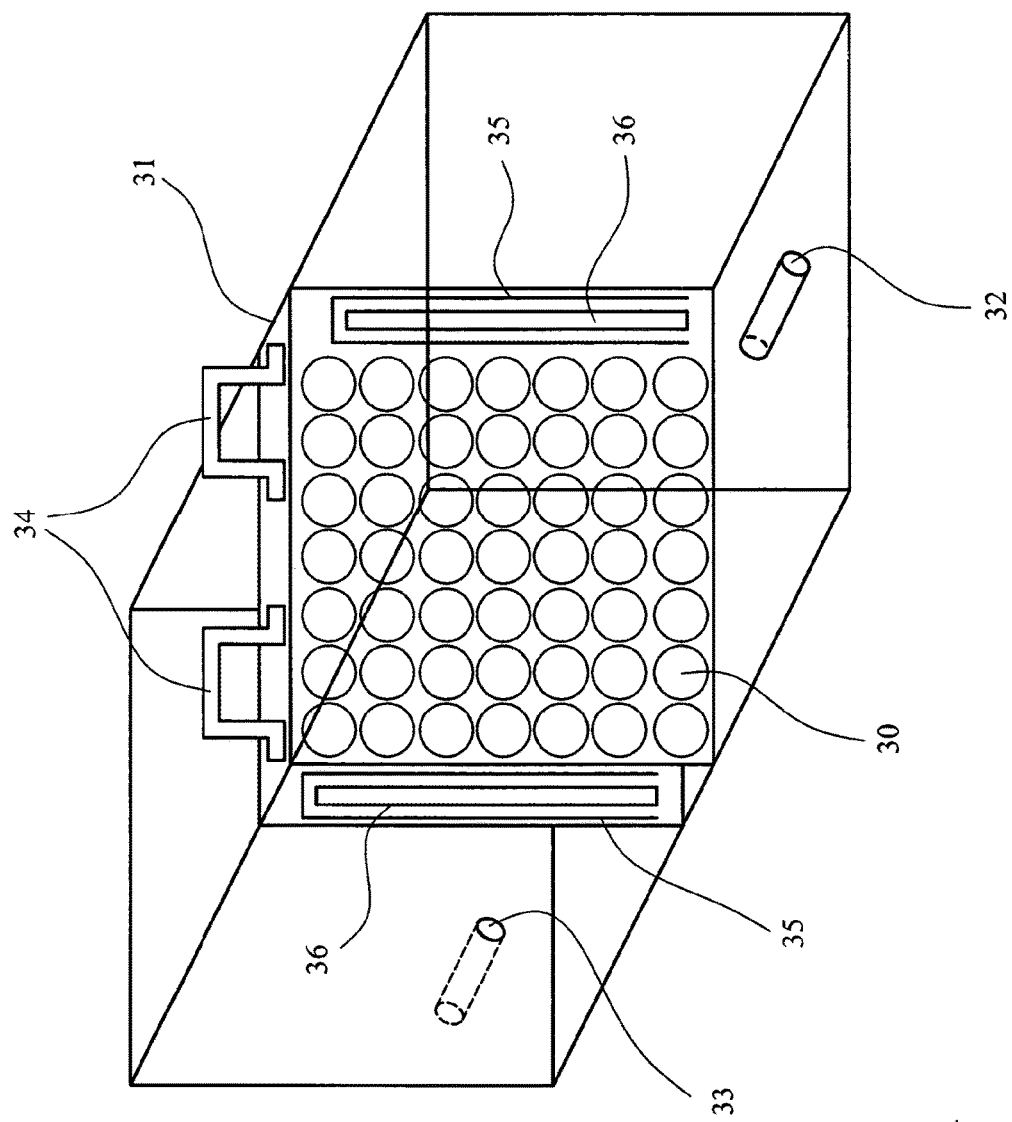

In yet another embodiment of the invention, illustrated in FIG. 6, the treatment material is in the form of loose pellets, granules or balls (30) which are located in a cartridge (31), the foraminous side walls of which allow intimate contact between at least some of the oil circulating in the tank between inlet channel exit (32) and outlet channel entrance (33) and the treatment material. The walls of the cartridge may be porous, perforated or mesh-like so as to achieve the requisite degree of contact between the circulating oil and the treatment material. The cartridge can be made out of a metal such as steel, another suitable metal, or of a high temperature plastic or similar material or of a ceramics material or from any other material which is stable at the temperatures experienced during the food frying process (typically up to approximately ° C.) and which is resistant to attack by virtue of a chemical reaction with the cooking oil. The cartridge can be rigid or alternatively could be made from flexible mesh like materials. The cartridge can be fitted with handles (34) or other means so as to allow for its ready removal, which is important in practice as with larger units the treatment media and cartridge may be quite heavy. An advantage of using a cartridge is that it facilitates the changing of the treatment material when it has reached the end of its useful life without the requirement to drain the oil from the treatment tank or to stop the treatment process taking place. This is particularly advantageous for the operators of large-scale industrial food frying equipment who wish to run such machinery substantially continuously and/or with as few interruptions as possible.

The treatment material, in the form of pellets or balls, can also be located in mesh bags which can either be free standing or contained within a cartridge with foraminous side walls, so as to allow intimate contact between at least some of the oil circulating in the tank between the inlet channel exit and the outlet channel entrance and the treatment material.

In one embodiment of the invention the side walls of the tank are fitted with female grooves or tracks (35) so as to receive and interconnect with male members (36) on the cartridge side walls and to hold them in place during the treatment operation, as shown in fig FIG. 6.

Figure 7:
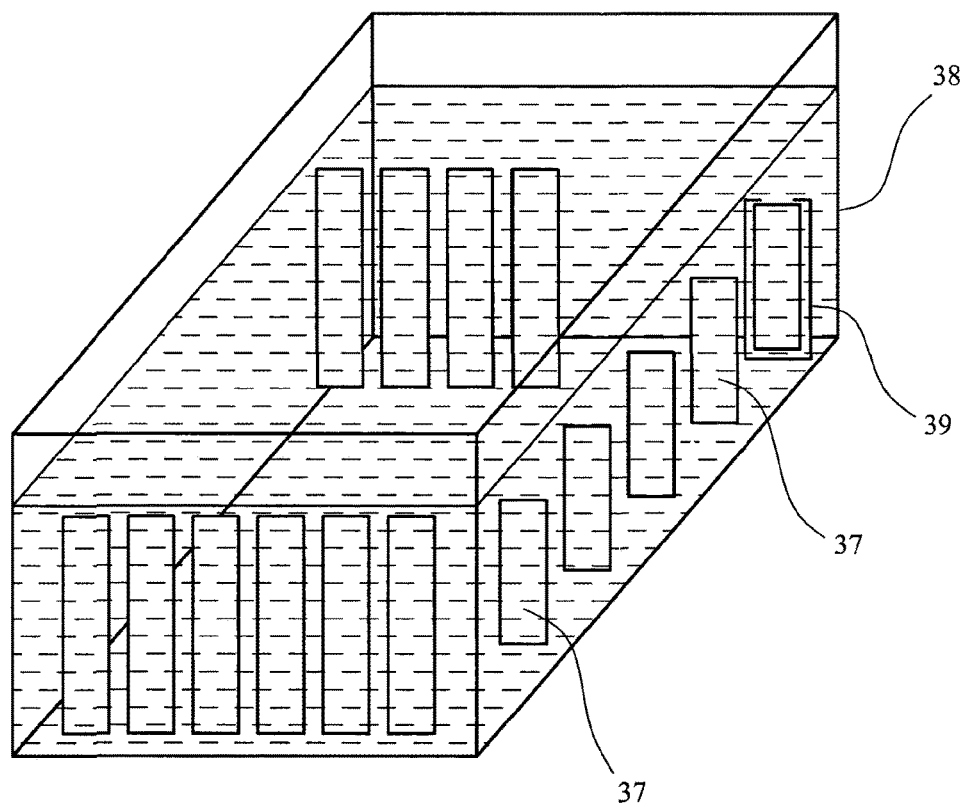

In a still further embodiment of the invention, illustrated in FIG. 7, the treatment material is stacked substantially vertically in towers (37) located in the treatment tank, (38). The cross section of the towers may be rectangular, circular or any other convenient shape. The side walls of the towers may be longer than the towers are high or may be shorter. In this embodiment the towers do not form a more or less continuous partition in the chamber but their relatively large cumulative surface area of the treatment material in such towers allows sufficient intimate contact between the cooking oil to be treated and the treatment material so as to effect efficient treatment. In this embodiment, the filter material can be in the form of standalone briquettes, blocks, pellets, granules or balls, which may as necessary be held in location by the use of foraminous cartridges (39), made of materials similar to those described previously in this patent specification. The towers may sit on the lower surface of the tank or may be suspended from a frame (not shown) into the tank. Whichever embodiment is chosen it is important that the treatment material is fully covered by the cooking oil to be treated so as to prevent the treatment material, which is strongly hygroscopic, from absorbing water vapour from the air which can lead to foaming in the oil.

Figure 8:
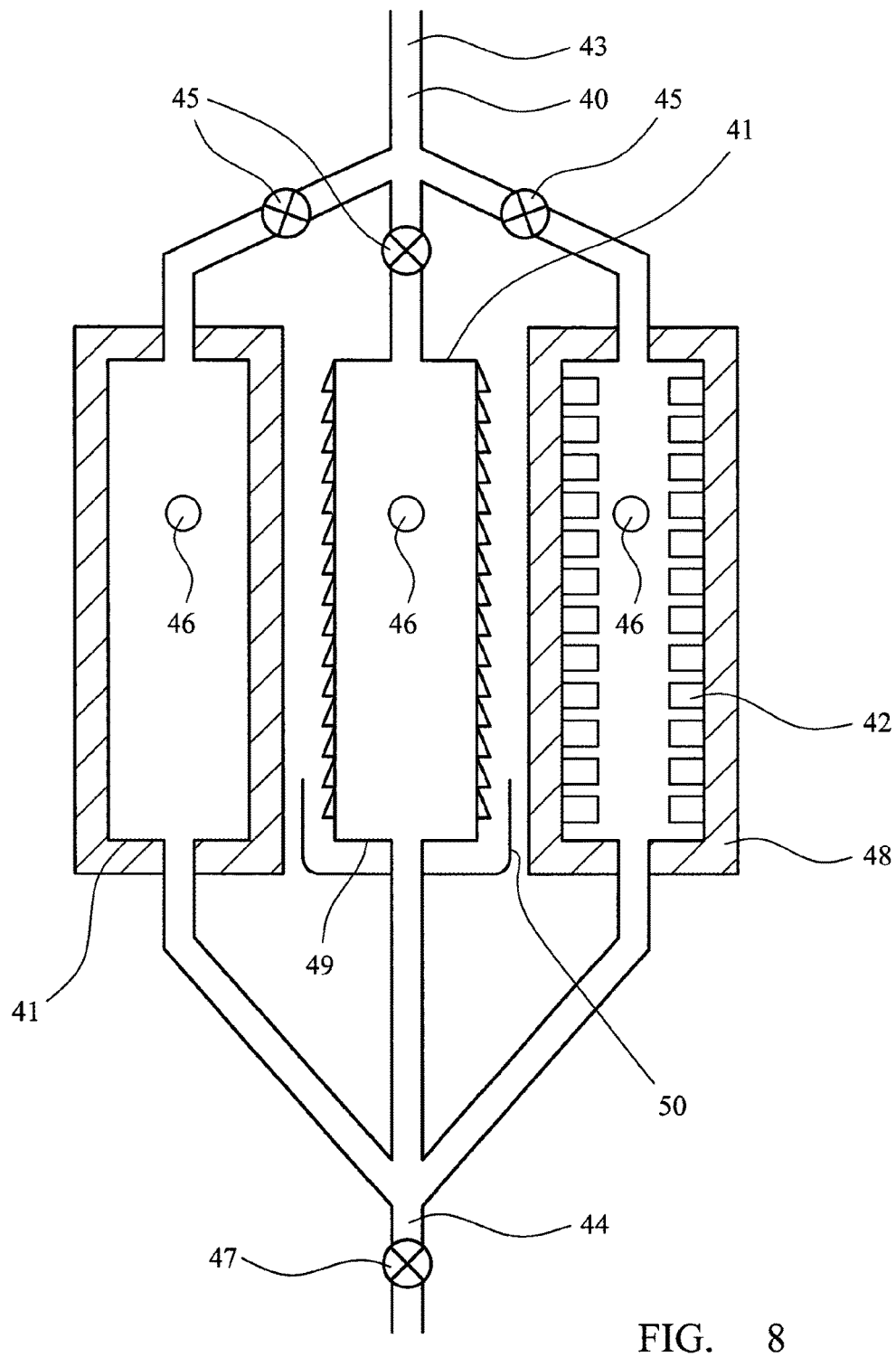
FIGS. 8-9 are schematic drawings of a further embodiment of the invention.

In a still further embodiment of the invention, illustrated in FIG. 8, the inlet channel (40) is removably connected to a number of cementious pipe members (41), made from the cementious materials described in the specifications of the BBM Patents. Such pipes can be manufactured in sections and attached together or optionally made as one piece. Protruding members (42) also made from the cementious materials described in the BBM Patents may optionally be provided on the inside of the side walls of the cementious pipe members so as to increase still further the area of surface contact between the oil to be treated and the cementious treatment material.

The oil to be treated (43) runs along the cementious pipe members situated between the inlet channel (40) and the outlet channel (44), which thereby allows for intimate contact between the cooking oil and the cementious filter material. Pipe sections can be replaced when the cementious material comprising them is spent. There is one tap (45) fitted for each removably connected pipe member, the tap being located upstream of the removably connected pipe member so as to allow the operator to turn the supply of cooking oil into that removably connected pipe member off completely. Any cooking oil in the removably connected pipe member is then allowed to drain into outlet channel (44) before removal of the spent removably connected pipe member and its replacement by a new removably connected pipe member. Each removably connected pipe member is optionally fitted with an openable/closable air inlet valve (46) so as to facilitate pumping out of the removably connected pipe member by pump 47. Each of the removably connected pipe members may also optionally be fitted with a close fitting full length sleeve (48) made of a suitable impermeable material (such as stainless steel) so as to allow any cooking oil permeating right through the side walls of the removably connected pipe member to return back to outlet conduit (44) via channels in the said sleeve (which are not shown on FIG. 8 for simplicity). Alternatively the oil may be allowed to penetrate right through the removably connected pipe members so that it is on the outside surface of such removably connected pipe members (49), as illustrated in FIG. 11, and can thereafter drain to a collecting device (50) for recirculation back into the frying chamber via the outlet channel (44). Such an embodiment is however not preferred as it allows for greater exposure of the hot oil to the air which will promote oxidation and hydrolysis breakdown reactions, thus producing more of the very breakdown products that the treatment media are intended to remove.

Figure 9:
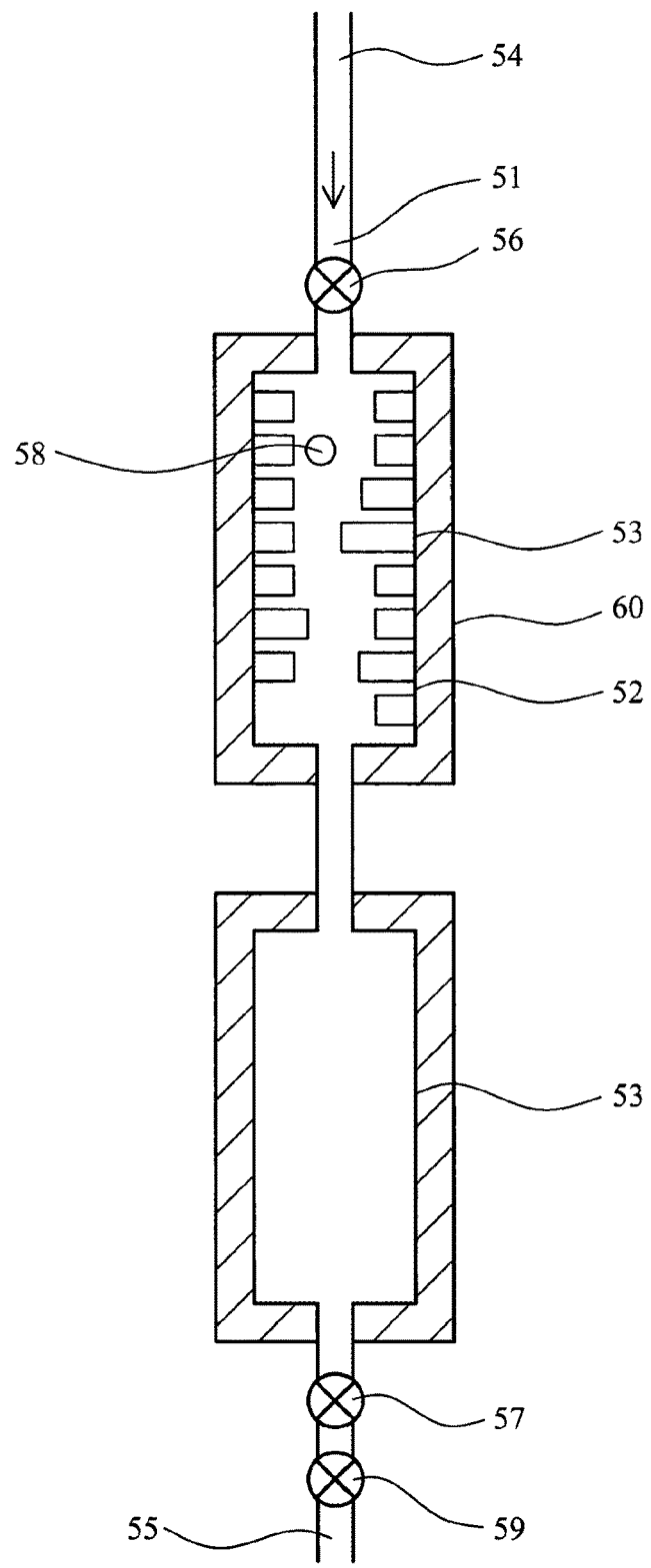

In a variant of the above mentioned embodiment, illustrated in FIG. 9, the exit of the inlet channel is removably connected to a single or to a number of inline cementious pipe members (52) in series, each made from the cementious materials as generally described in the BBM Patents. The cementious pipe members may optionally be fitted with protruding members on the inside side walls (53) also made from the cementious materials described in the BBM Patents, so as to increase still further the area of surface contact between the oil to be treated and the cementious material.

The oil to be treated (54) runs along the length of the cementious pipe members (52) situated between the exit of the inlet channel (53) and the entrance of the outlet channel (55), which thereby allows for intimate contact between the cooking oil and the cementious filter material. Pipe sections can be replaced when the cementious material comprising them is spent. There is one tap (56) fitted in close proximity to the exit of the inlet channel and one tap (57) located in close proximity to the entrance of the outlet channel (55). To drain the pipe members of oil prior to changing them, the valve nearest the inlet channel (56) is turned to the closed position and optional air inlet valve (58) is opened. Any remaining oil in the pipe sections is then pumped clear of outlet channel (55) by the use of pump means (59) or by gravity flow as appropriate. Once emptied then tap (57) is turned to the off position and the removably connected pipe members are then removed and replaced with fresh ones.

The removably connected pipe members may also optionally be fitted with a close fitting sleeve (60) made of a suitable impermeable material, so as to retain any oil permeating right through the sides walls of the pipe members and allow it to return via channels in the sleeve (not shown) back to the outlet channel (55) back and on to the frying chamber.

The treatment tank may optionally also be fitted with other filtering means, not shown. These may include for example a conventional particulate filter suitable for the removal of food debris. Other known filtering equipment may also be used in combination with and/or part of the equipment here in described.

The treatment tank may optionally also be fitted with a heating element or gas burner, under thermostatic control, so as to maintain the oil at the required temperature.

The treatment tank may further optionally be fitted with insulation means to reduce the heat loss occurring in the tank.

How the invention may be put into effect will now be further described by reference to the following examples.

Example 1

Filters were made with Alborg white cement clinker and Alborg White OPC. Alborg white clinker is made using an extremely pure limestone originating from a marine deposit which is now located in Denmark and was obtained from Aalborg Portland A/S—Denmark, Aalborg Portland A/S, Rørdalsvej 44, P.O. Box 165, 9100 Aalborg, Denmark.

The unmilled clinker was obtained from Hanson Cement, Ketton Works

Ketton, Stamford, Lincolnshire.

A typical composition of the Alborg clinker used is: —
$SiO_2$ 25.0%
$Al_2O_3$ 2.00%
$Fe_2O_3$ 0.30%
CaO 69.0

This gives a calculated Bogue composition as follows: —
$C_3S$ 65.0%
$C_2S$ 21.0%
$C_3A$ 5.0%
$C_4AF$ 1.0%
$CaSO_4$ 0%

The equivalent typical figures for the OPC used in this experiment were: —
$SO_3$ 2.03%
$SiO_2$ 24.4%
$Al_2O_3$ 1.97%
$Fe_2O_3$ 0.34%
CaO 68.6%
MgO 0.58%
Cl 0.01%
$TiO_2$ 0.09%
$P_2O_5$ 0.30%
$K_2O$ 0.16%
$Na_2O$ 0.19%

Thus giving a calculated Bogue composition (corrected to take into account a free lime content of about 3%):
$C_3S$ 66.04%
$C_2S$ 20.1%
$C_3A$ 4.64%
$C_4AF$ 1.04%
$CaSO_4$ 3.45%

Importantly the clinker has a very low free iron content which is important as iron is a powerful pro-oxidant trace metal, (see for example Sonntag 1979 in Bailey's industrial Oil and fat Products, New York, John Wiley and Sons, Vol 1. pp 152).

The clinker was milled by an external ball-miller to a "ready-to-use" grain-size of nominally 14.5 μm, with the particle size distribution being such that the d50 was 13.33 μm±4.7%, which was approximately the same size as the cement used. Once milled the clinker was kept in a dry sealed plastic container to prevent clumping, until use.

Both the clinker and the cement were fine sieved immediately prior to mixing to remove any large clumps before addition of the water.

The mix to make the filters comprised three parts of clinker to one part of OPC as well as relatively minor amounts of microsilica (12% by weight of the paste) and a small amount of Microair 119, an air entraining agent manufactured by BASF, added in accordance with user instructions.

The incorporation of micro silica into the mix has several effects due to its strong pozzolanic activity. It accelerates the hydration reactions of the clinker phases (particularly alite). The fine microsilica particles fill the spaces between clinker grains thereby producing a denser paste and stronger overall cement. The addition of microsilica further reduces the amount of free calcium hydroxide produced by the hydration of alite and belite and promotes the production of calcium silicate hydrate gel. This reduces foaming.

For many years entrained air has been deliberately incorporated into concrete and cement mixtures in parts of the world which experience freezing so as to reduce the damage caused by repeated cycles of freezing and thawing. Chemical additives, known as air entraining agents, are used to produce a stable system of discrete air voids, which are typically extremely small being between 10 μm and 1 mm. There are normally more than 1 million such bubbles in one cubic inch of treated paste or more than 60,000 per cubic centimeter. The entrained air void system in cement can be viewed and determined from the examination of a cut and polished section of a hardened cement sample, using microscopic techniques in accordance with ASTM C457 (standard test method for microscopical determination parameters of the air void system in hardened concrete).

Such air voids provide empty spaces within the cement or concrete and are known to act as storage sites for freezing water moving in the capillary pores, thereby relieving the pressure generated during freezing and preventing damage to the cement or concrete. However it has surprisingly been found that the addition of relatively small amounts of air entraining agents to mixtures of the type used to make the filters of the type described in the BBM Patents produces very much more porous filters, which absorb very considerably much more free fatty acids and aldehydes than filters without such air entraining agents. There are a number of well-known types of air entraining agents. Typically these are surfactants and include for example wood derived acid salts, wood rosin, tall oil, vegetable oil acid salts such as the alkanolamine salt of coconut oil, synthetic detergents such as alkyl-aryle sulfonates and sulfates such as dodecylbenzenesulfonate. The surfactant used in the invention disclosed herein must be non-toxic. The man skilled in the art will readily be able to identify numerous such non-toxic air entraining agents suitable for use in the invention herein described.

Thorough mixing of the clinker, the OPC, the air entraining agent and the microsilica, using an industrial mixer took place and then sufficient water was added to give a good paste in accordance with the following mix design:—

| Mix Design | | |
|---|---|---|
| WHITE CEMENT | Kg | 0.900 |
| CLINKER | Kg | 2.700 |
| DEIONISED WATER | Kg | 1.800 |
| ANHYDRITE | Kg | 0.054 |
| MICROSILICA | Kg | 0.400 |
| Microair 119 | ml | 24.000 |
| Dry Total | | 4.05 |

Assuming about 10% of the mix was wasted in the mixer and in the moulds this 4.05 kg of mix would typically produce about 15 treatment blocks, each with a weight before drying of 240 gms.

The paste was then placed into moulds, of the type depicted in FIGS. 1 to 4 of WO/2013/121206 and as further described in that patent application. The moulds used in this embodiment had however 30 holes of diameter of 0.5 cm so as to promote intimate contact between the oil to be treated and the treatment material. The paste was allowed to cure until fully set. Thereafter the filter units were dried in an industrial oven for 6 hours at 130° C. to remove excess water and were then individually sealed in water impermeable wrapping.

The dimensions of the filter were approximately 15 cm×2 cm×9 cm with 30 holes each with a diameter of approximately 0.5 cm: (these figures ignore slight tapering of the filter to facilitate extraction from the mould).

The porosity of hardened cement paste is discussed e.g. by Alford et al. in their article entitled "An assessment of porosity and pore sizes in hardened cement pastes", J. Materials Sci., 16, (1981) 3105-3114. The porosity of a cementious article can be estimated by firstly weighing the article after it has been dried in an industrial oven for 72 hours at 130° C. (to give weight A) and then immersing it in water at room temperature until the article is fully saturated with water and then weighing it fully saturated (weight B). The total weight of the water taken up is then weight B minus weight A, which when multiplied by the density of the cement/density of water gives a figure which as a percentage of weight A represents the porosity of the filter.

The filters made for the purposes of this example had a porosity determined in accordance with the above described method of between 45 to 50%.

Figure 10:
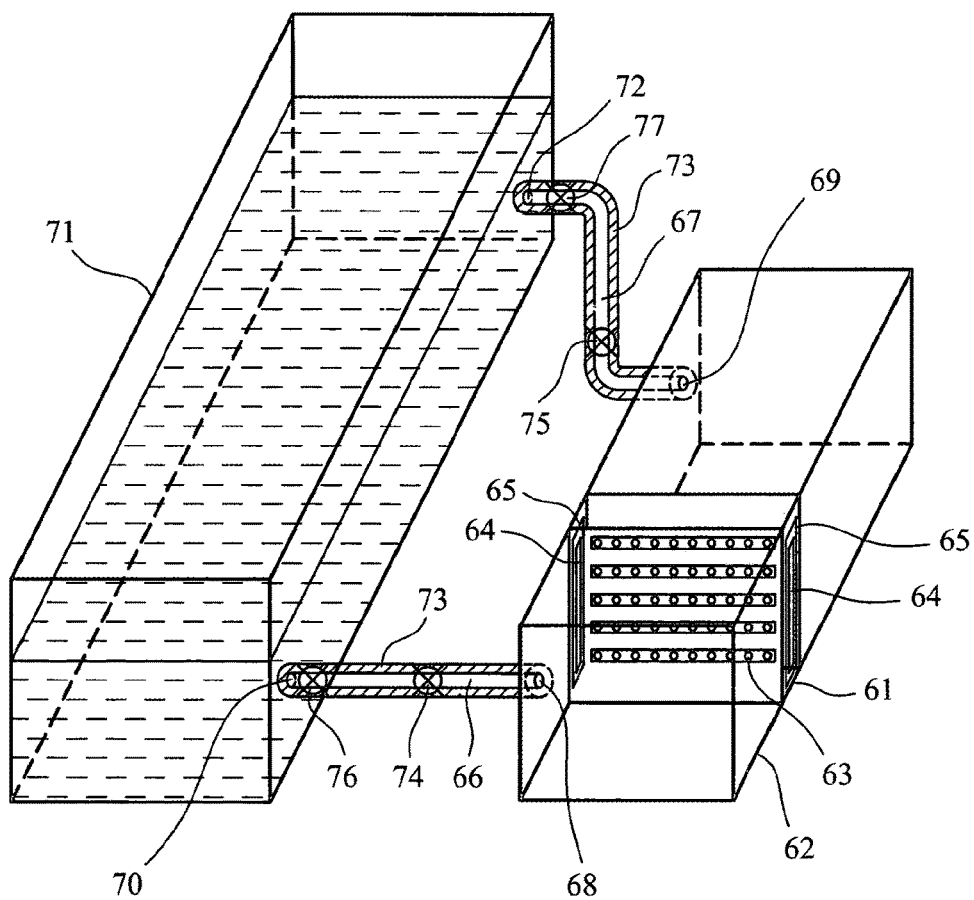
FIG. 10 is a further general arrangement drawing.

200 filters made in this manner were then located into twenty cartridges which were located in a tank with a capacity to hold approximately a 90 liter capacity. The general arrangement is shown in FIG. 10 but for simplicity only one such cartridge (61) is shown, fitted to the treatment tank (62). The treatment tank and the frying equipment are not shown drawn to scale in FIG. 10.

Each cartridge could hold ten treatment briquettes (63), stacked on top of each other with the largest face (9×15 cm) containing the 30 holes facing forwards. Two male ridges on each of the cartridges (64) fitted into corresponding female groves (65) of the treatment tank (62).

The treatment tank was connected, via an inlet channel (66) and an outlet channel (67), each being a stainless steel pipe, to a large scale continuous cycle industrial chip fryer, which was used to manufacture bagged, frozen pre-fried potato chips. The exit of the inlet channel (68) was located on one side of the rows of treatment elements and the entrance to the outlet channel (69) was located on the other side of the rows of treatment elements so as to enable intimate contact between the cooking oil to be treated and the treatment medium.

The frying tank of this fryer held approximately 1,650 liters of cooking oil during use. The auto-top up oil feature of the fryer was disabled so as to keep the amount of oil in the frying chamber at a constant. The entrance of the inlet channel (70) was inserted through a side wall of the frying chamber (71) at one end of the fryer and the exit of the outlet channel (72) was inserted through the sidewall of the fryer at the other end of the fryer, such that the distance between entrance points of the inlet and outlet channels in the frying chamber was in excess of 450 cm. The stainless steel pipes were lagged, outside the frying tank and treatment tank with glass mineral wool (73) to reduce heat loss.

Pump means (74) was used to bring the oil into the treatment chamber via the inlet valve and then other pump means (75) were used to pump the oil out after treatment back into the frying chamber.

Oils develop acidity during frying due to oxidation, hydrolysis and other decomposition routes. Different oils have different oxidation and hydrolysis rates. The free fatty acid level in any given oil in a fryer is determined by the starting FFA level, the subsequent rate of FFA generation and the amount of its elimination by distillation and absorption by food. It is essential therefore if meaningful data on FFA levels are to be obtained to use the same oil throughout all experiments.

The trials described herein were all conducted with sunflower oil from the same manufacturer's batch, which contains E900 (PDMS anti-foaming agent). 16,500 liters of such cooking oil was then added to the frying tank and it was switched on and the thermostatic control was set to 185° C. Two taps (76, 77), fitted respectively near the entrance of the inlet channel and the exit to the outlet channel, were then opened to as to allow cooking oil from the frying chamber to enter into the treatment tank. 65 liters of additional cooking oil were then added to the frying chamber so as to ensure both that the cooking oil was maintained at the appropriate level for the frying operation and that the top layer of treatment blocks in the treatment tank were fully covered by cooking oil. A lagged close fitting lid was then placed on top of the treatment tank (not shown in the drawings) so as to reduce heat loss and reduce oxidation/hydrolysis through contact with the air.

Ten tonnes of washed, peeled and cut potatoes were put through the fryer in an eight hour shift. Two shifts were run a day and at the end of each day's two production shifts, 50 gm samples of the oil were taken, after the oil had cooled and been filtered using the fryers own internal particulate filter. The samples were then flushed with nitrogen and kept at minus 20° C. away from any source of light until analysed so as to prevent further breakdown of the oil.

These were then compared with the oil taken from the same fryer at the end of each day for four days (two shifts per day, ten tonnes per shift) but with the inlet value and outlet valves to the treatment tank (77, 78) in the closed position and the treatment tank pump and heater turned off.

The free fatty acid was measured for each sample (in accordance with the procedure laid down in IUPAC (1979), Standard Methods for Oils, Fats and Derivatives, 6$^{th}$ edn, Pergamon Press, Oxford, reference 2) and the averaged results are tabulated below: —

| Day | FFA % with treatment tank connected* | FFA % with the treatment tank disconnected |
|---|---|---|
| 0 | 0.04 | 0.05 |
| 1 | 0.32 | 0.45 |
| 2 | 0.36 | 0.55 |
| 3 | 0.35 | 0.67 |
| 4 | 0.43 | 0.79 |

It can be seen that the use of the treatment tank materially reduced the rate of build-up of the free fatty acids, the increased presence of which would otherwise have decreased the smoke point and flash point of the oil and increased the oil absorption into the food cooked into the oil. High levels of free fatty acid have also been shown to catalyse further hydrolysis of triglycerides and to promote oxidation reactions, thus causing a feedback driven process to create yet more free fatty acid/oil degradation.

* Note that the results for the oil connected to the treatment tank were adjusted to compensate for the fact that in that experimental run there were 1715 liters of cooking oil in the system compared to 1650 in the fryer not connected to the treatment tank. The extra oil was assumed to dilute the free fatty acids on a linear basis so that the results actually obtained were divided by a correcting factor being 1715/1650=1.04.

An alternative method of testing acidity is to use the CNS 3647 method which gives a result in gm of KOH per gm of oil, which is a good proxy for acid concentration.

Total Polar Compounds

Some authors and experts in the field have questioned how reliable free fatty acid concentration is as a measure of oil quality, (see for example effective Process Control in Frying by GB Quaglia et al at page 237 of Frying, Improving quality, edited by J. B. Rossell, Woodhead Publishing Limited). Accordingly the amount of total polar compounds was also measured as it is (along with acid value) a very commonly used indicator of oil quality and is widely use in many international regulations: (see for example Fritch, C. W. 1981. Measurements of frying fat deterioration. A brief review. J. Am. Oil Chem Coc. 58: 272-274 and Firestone, D. 2007. Regulation of frying fat and oil, In "Deep Frying: Chemistry, Nutrition, and Practical Applications". 2$^{nd}$ ed. Pp. 373-385. Erickson, M. D. ed. AOCS Press, Urbaba, USA.)

The content of total polar compounds in oil can be determined by the use of the methods set out in AOCS Cd_20-91 and ISO 8420. Typically a glass column (for example 35 cm in length and 2.1 cm in diameter) is used to effect the chromatography. A suitable eluent is a mixture of petroleum and diehthyl ether in the ration of 87:13 (v/v). The oil sample to be tested (2.5 g) is loaded into the packed column and the non-polar compounds (%) is calculated as the mass fraction of the total polar compounds in the oil sample as a percentage.

However the AOCS Cd_20-91 and ISO 8420 procedures need to be carried out in a laboratory with proper equipment by a skilled technician and is not suitable for on site testing. Accordingly, we used a Testo 270 Deep frying oil tester (Testo Inc. Germany), which gives a more or less instantaneous reading of total polar compounds as a percentage when its probe is put into the oil to be tested and used in accordance with the manufacturer's instructions. The oil to be tested was tested at 55° C.

Oil samples collected during the previous FFA testing were analysed using the Testo 270 and the results are tabulated below: —

| Day | TPC % with treatment tank connected | TPC % with the treatment tank disconnected |
| --- | --- | --- |
| 0 | 5.5 | 5.5 |
| 1 | 8.3 | 9.9 |
| 2 | 10.2 | 14.3 |
| 3 | 12.8 | 17.1 |
| 4 | 15.8 | 19.8 |

It can be seen that the use of the treatment tank materially reduced the presence of total polar compounds.

Aldehydes

The aldehyde concentration of the oil was also ascertained as described below. Aldehydes are a good indicator of oil quality for several reasons. Firstly aldehydes, even in very low concentrations, are known to cause many of the off-flavours observed in used cooking oils and in food fried in such cooking oils. Secondly such aldehydes are secondary oxidation products, resulting from the breakdown of primary oxidation products and therefore can be seen as a good proxy for the concentration of such primary oxidation products.

Thirdly many aldehydes are considered to be injurious to human health, (see Warning: thermally-stressed polyunsaturates are damaging to health, Martin Grootveld, Christopher J. L. Silwood and Andrew W. D. Claxson Food Chemistry 67 (1999) 211-213). During frying, polyunsaturated fatty acids oxidize and form degradation products with proven toxicity, such as 4-hydroxy-2-(E)-nonenal: (see for example Seppanen C M, Csallany A S (2001) Simultaneous Determination of Lipophilic Aldehydes by High-Performance Liquid Chromatography in Vegetable Oil. J Am Oil).

Particular aldehydes of interest include: —
(a) trans-2-alkenals
(b) trans,trans-alka-2,4-dienals,
(c) 4,5-epoxy-trans-2-alkenals
(d) 4-hydroxy-trans-2-alkenals
(e) cis,trans-alka-2,4-dienals and
(f) n-alkanals.

Detection and measurement of the concentrations of such aldehydes in cooking oils taken from the frying chamber, after four days of frying (two shifts a day, 10 tonnes of pealed, washed and cut potatoes per shift) was determined in accordance with the methodology as set out on pages 22 to 23 of WO 2008/015481 A2, which is incorporated by reference herein and the results are tabulated below as between (a) the fryer with the treatment tank functioning and (b) the fryer with the treatment tank not functioning, samples being taken at the end of each day of 4 consecutive days of frying. 50 gm samples of the oil were taken, after the oil had cooled and been filtered using the fryers own internal particulate filter. The samples were then flushed with nitrogen and kept at minus 20° C. away from any source of light until analysed so as to prevent further breakdown of the oil. The results are tabulated below: —

| 4 Days | trans-2-alkenal | trans,trans-alka-2,4-dienal | 4,5-epoxy-trans-2-alkenal | 4-OH-trans-2-alkenal | cis,trans-alka-2,4-dienal | n-alkanal |
| --- | --- | --- | --- | --- | --- | --- |
| treatment tank not functioning | 26.0 | 38.4 | 5.1 | 3.9 | 8.2 | 4.6 |
| treatment tank functional | 10.8 | 24.2 | 2.3 | 1.6 | 2.7 | 3.1 |

All units are mmol/kg oil detected in $^1$HMR experiments conducted on sunflower oil.

Note that the same adjustment factor of 1.04 was again applied to the results obtained from this set of experiments for the reasons set out above.

It can again be seen that the use of the treatment tank materially reduced the presence of these toxic aldehydes.

Thus these experiments demonstrate that the use of an out of frying tank treatment facility as described herein does effect useful treatment of the used cooked oil, notwithstanding the considerable amount of cooking oil required to be treated. The cooking oil so treated was capable of being used for an additional four days before being finally discarded for recycling.

The invention claimed is:

1. A method for preserving cooking oil, consisting essentially of the steps of:
   hydraulically hardening an oil-permeable cementitious material from a paste comprising greater than 50 wt % of a member selected from the group consisting of white ordinary Portland cement clinker, white ordinary Portland cement and a combination thereof, wherein said oil-permeable cementitious material has a porosity of 30%-55%;
   forming said oil-permeable cementitious material as stand-alone blocks, pellets, granules or balls; and,
   treating cooking oil with said oil-permeable cementitious material following said step of hydraulically hardening said oil-permeable cementitious material from said paste, said treating step being able to be performed during both a frying operation and between frying operations in a separate treatment tank.

2. The method for preserving cooking oil according to claim 1, wherein said paste further includes ingredients selected from the group consisting of silica, titania, lime, calcium sulphate, hydrated alumina, natural feldspars, diatomaceous earth, sodium zeolites, calcium zeolites, a clay and a combination thereof.

3. The method for preserving cooking oil according to claim 2, wherein said silica is a silicate mineral selected from the group consisting of calcium silicate, magnesium silicate, aluminum silicate, agalmatolite, an amphibole, attapulgite, a porphyry, kaolinite, rhyolite, talc, wollastonite and a combination thereof.

4. The method for preserving cooking oil according to claim 3, wherein said porphyry is granite porphyry.

5. The method for preserving cooking oil according to claim 2, wherein said silica is at least 5% by weight of microsilica.

6. The method for preserving cooking oil according to claim 2, wherein said clay is a member selected from the group consisting of a pillared clay, an activated clay/earth and a combination thereof.

7. The method for preserving cooking oil according to claim 1, wherein said paste further includes anhydrite.

8. The method for preserving cooking oil according to claim 1, wherein said paste further includes a non-toxic air entraining agent.

9. A method for preserving cooking oil, comprising the steps of:
   providing an oil-permeable cementitious material in the form of a pipe member or the lining for a pipe member, wherein said oil-permeable cementitious material is made by hydraulically hardening said oil-permeable cementitious material from a paste comprising greater than 50 wt % of a member selected from the group consisting of white ordinary Portland cement clinker, white ordinary Portland cement and a combination thereof, wherein said oil-permeable cementious material has a porosity of 30%-55%; and, treating cooking oil with said oil-permeable cementious material following said step of hydraulically hardening said oil-permeable cementious material from said paste.

10. The method for preserving cooking oil according to claim 9, wherein said paste further includes ingredients selected from the group consisting of silica, titania, lime, calcium sulphate, hydrated alumina, natural feldspars, diatomaceous earth, sodium zeolites, calcium zeolites, a clay and a combination thereof.

11. The method for preserving cooking oil according to claim 10, wherein said silica is a silicate mineral selected from the group consisting of calcium silicate, magnesium silicate, aluminum silicate, agalmatolite, an amphibole, attapulgite, a porphyry, kaolinite, rhyolite, talc, wollastonite and a combination thereof.

12. The method for preserving cooking oil according to claim 10, wherein said silica is at least 5% by weight of microsilica.

* * * * *